Figures 1, 2:
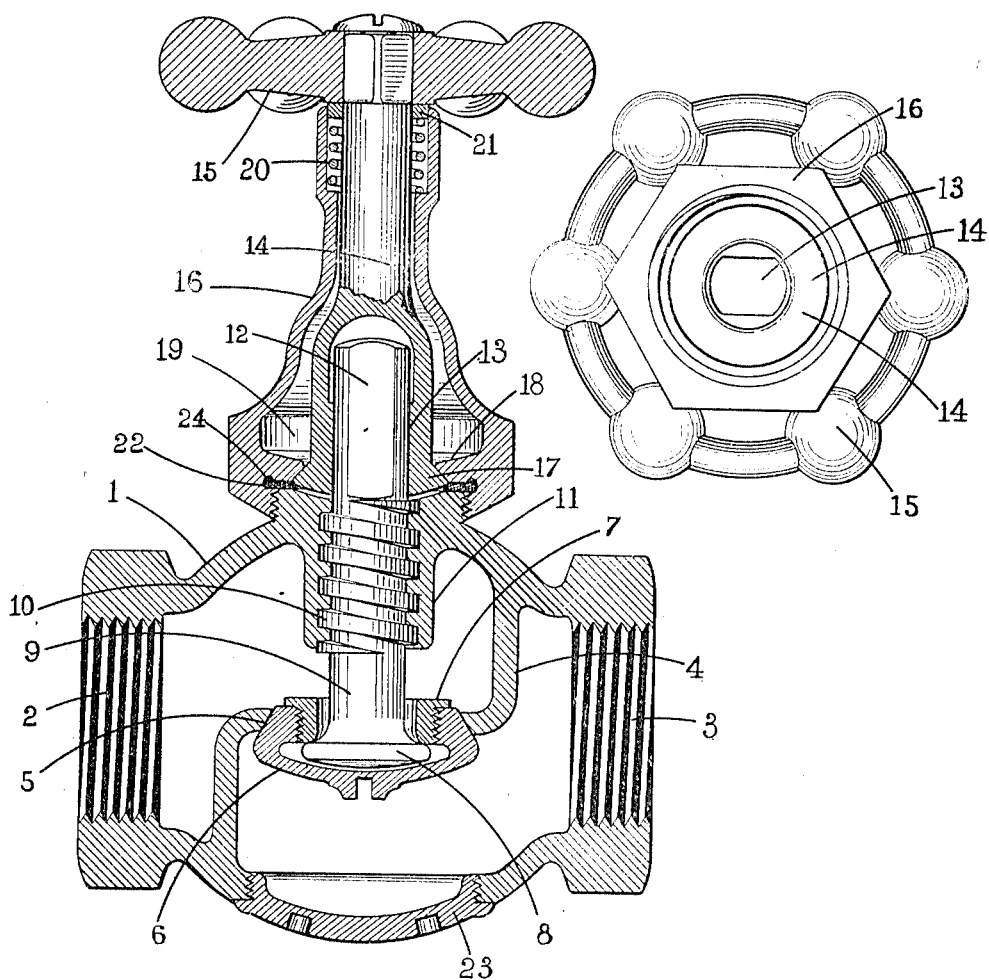

J. W. MASTER.
VALVE.
APPLICATION FILED DEC. 3, 1912.

1,063,988.

Patented June 10, 1913.

Witnesses:   Inventor.

UNITED STATES PATENT OFFICE.

JAMES W. MASTER, OF SAN DIEGO, CALIFORNIA, ASSIGNOR OF ONE-THIRD TO BRYANT H. HOWARD, OF SAN DIEGO, CALIFORNIA.

VALVE.

Specification of Letters Patent. Patented June 10, 1913.

Application filed December 3, 1912. Serial No. 734,765.

*To all whom it may concern:*

Be it known that I, JAMES W. MASTER, a citizen of the United States, residing at San Diego, in the county of San Diego and State of California, have invented a new and Improved Valve, of which the following is a full and exact description.

My invention has reference to valves and is designed as an improvement on the valve shown and described in Letters Patent No. 752,241, issued to me on the sixteenth day of February, 1904.

It is a design of the invention to produce a valve that is simple, compact, and durable, that has correlative parts effectual in preventing leakage at the valve-stem irrespective of the pressure within the valve or the manipulation of the valve parts, that has interchangeable and detachable parts, that has a large reservoir for a lubricating material to be placed therein for the protection of the valve-stem joint from wear, and from scale and the like, that has an increased area of valve seat opening, that has means for a closer and more perfect fit of the valve disk in its seat insuring a more positive closure of the same, that obviates the turning of the valve-stem out of its thread when the valve is opened to its fullest extent, that has a packless valve-stem thereby obviating the necessity of a frequent renewal of parts, a common occurrence in valves of ordinary structure, that has means for holding the valve-stem joint in a close contact constantly, thereby effectively maintaining its efficiency for controlling the flow of a medium, and that has a minimum number of parts effective for economy of structure and production.

The principles herein related may be embodied into any suitable form of apparatus and combination of parts, provided that the elements thereof are relatively proportioned and arranged to perform the functions herein set forth and operate in the manner herein described, a preferred form of the device being shown in the accompanying drawings, whereon—

Figure 1 is an elevational section of a valve incorporating the principles of this invention, and Fig. 2 is a plan view of the lower end of the bonnet and the upper valve stem, assembled In the several figures of the drawing, similar reference characters apply to like parts.

Assuming the invention to be embodied in the form illustrated, a valve shell 1, is provided with ports 2 and 3, respectively at each end thereof, and web 4, forming compartments, said web having valve seat 5, with an opening as large as practicable for an effectual means of communication between said compartments, and with beveled edges, effectual for a positive closure and for preventing an accumulation of grit and foreign particles thereon. A correspondingly beveled disk 6, for seat 5, is connected by a loose fitting nut 7, to lower flanged end 8, of valve stem 9, whereby the disk rocks sufficiently in seating to insure a perfect closure. Stem 9 has a threaded part 10. engaging with a correspondingly threaded extension 11, in shell 1, the threaded part being sufficient to avoid disengagement with said extension when the valve is opened to the full extent, and also has the upper part flattened with parallel faces 12, to engage with a correspondingly shaped socket 13, in the lower end of upper stem 14. Stem 14 is manipulated by hand wheel 15, and is rotatably mounted in bonnet 16, the stem being provided with cone flange 17, engaging with a corresponding flange 18, of the bonnet, thereby forming a cone joint which prevents leakage around the valve stem. Chamber 19, above this joint, may contain oil or lubricant which will be fed to all working parts of the valve. The lubricant will cause a more perfect closure of the cone joint and the lubrication of the parts tends to prevent the formation of scale and the like. The upper part of chamber 19 contains a coiled spring 20, bearing against collar 21, underneath the hub of hand wheel 15, which tends to force the valve stem upward, thereby retaining the cone joint in close contact and producing a self-grinding joint, an important desideratum in valve structure. A metallic washer or gasket 22, is fitted in said bonnet, and is retained by and in groove 24, just above the screw threads connecting the bonnet with the valve shell, the said washer preventing scale and the like from contact with the cone joint. The bottom of the valve shell is provided with a removable cap 23, which, when removed, leaves an opening for the more convenient access to the valve disk and seat for the purpose of regrinding and adjustment.

It may be seen that the upper stem section has no vertical movement, and that the valve disk seats with the pressure, making a shorter valve stem practical, and a smaller hand wheel suitable for its manipulation. The lubricant needs renewal only at long intervals. Changes and different degrees of temperature of the different parts do not affect the joints as they are self adjusting. The hand wheel and stem are braced and well supported by the bonnet. All working joints in the valve are protected from grit and the like, by the hub of the hand wheel which covers the upper end of the bonnet. The valve may be made at a low cost as only the screw threads and working joints require machine finish. The pressure the valve will withstand is limited only by the strength of the material used in its construction. Similar valve stems and bonnets may be made to interchange on two consecutive sizes of the valve. Valve stem threads 10, are left-handed, permitting the non-rising stem 14, to be operated in the usual manner to open and close the valve.

From the foregoing description taken in connection with the drawings, it may be seen that simple means are herein provided which are efficient and effectual for accomplishing the objects of the invention, and the elements shown and described are well adapted to serve the purposes for which they are intended, but it is to be understood that no limitation is necessarily made to the precise structural details exhibited in the drawings, for variations, alterations, and modifications, may be adopted without departing from the spirit of the invention, such changes if made, to at all times fall within the scope of the appended claims, the essence of my invention comprising a device with the combination and arrangement of parts, effective for controlling the flow of a medium through avenues of connection, such as pipes and the like, and to offer a minimum of friction and resistance to the medium when the valve is opened, and to prevent leakage thereof relative to the controlling means.

Having thus described its nature and objects, and its especial adaptability to accomplish the purposes set forth, I claim as my invention—

The combination with a valve casing, of a valve stem having screw connection therewith, the upper end of said item being flattened, a bonnet connected to the upper end of said casing, an upper valve stem carried by said bonnet, said upper stem having a socket to engage with said flattened end of the lower valve stem, said upper valve stem having a cone joint arranged at the lower part of the socket end and forming a connection with said bonnet, said bonnet being provided with an undercut groove, and a gasket arranged in said groove between said bonnet and casing and fitted around the socketed portion of said upper valve stem to prevent leakage when said valve stems are actuated, substantially as set forth.

In testimony whereof I have affixed my signature to the foregoing specification, this 14 day of November in the year 1912.

JAMES W. MASTER.

In the presence of—
BRYANT H. HOWARD,
F. L. ANDREWS.